United States Patent
Bhaskar et al.

(10) Patent No.: US 9,797,377 B2
(45) Date of Patent: Oct. 24, 2017

(54) SYSTEM AND METHOD FOR CONTROLLING A WIND FARM

(71) Applicant: General Electric Company, Schenectady, NY (US)

(72) Inventors: Nitika Bhaskar, Karnataka (IN); Akshay Ambekar Krishnamurty, Bangalore (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 186 days.

(21) Appl. No.: 14/696,808

(22) Filed: Apr. 27, 2015

(65) Prior Publication Data

US 2015/0308413 A1    Oct. 29, 2015

(30) Foreign Application Priority Data

Apr. 29, 2014 (IN) .......................... 2156/CHE/2014

(51) Int. Cl.
*F03D 7/04* (2006.01)
*F03D 7/02* (2006.01)
(Continued)

(52) U.S. Cl.
CPC ............ *F03D 7/048* (2013.01); *F03D 7/028* (2013.01); *F03D 9/257* (2017.02); *H02J 3/386* (2013.01);
(Continued)

(58) Field of Classification Search
CPC . H02J 3/386; F05B 2270/20; F05B 2270/335; F05B 2270/32; F05B 2270/327;
(Continued)

(56) References Cited

U.S. PATENT DOCUMENTS 5,982,046 A * 11/1999 Minh .................. F03D 1/04
290/44
6,512,966 B2 * 1/2003 Lof .................. F03D 7/0284
290/44
(Continued)

OTHER PUBLICATIONS

European Search Report and Written Opinion issued in connection with corresponding EP Application No. 15164369.9-1607 dated Aug. 28, 2015.
(Continued)

*Primary Examiner* — Crystal J Barnes-Bullock
(74) *Attorney, Agent, or Firm* — Douglas D. Zhang; GE Global Patent Operation

(57) ABSTRACT

The present disclosure is directed to a system and method for controlling a wind farm. The method includes operating the wind farm based on multiple control settings over a plurality of time intervals. A next step includes collecting one or more wind parameters of the wind farm over the plurality of time intervals and one or more operating data points for each of the wind turbines in the wind farm for the plurality time intervals. The method also includes calculating a contribution of the operating data points for each of the wind turbines as a function of the one or more wind parameters. Further steps of the method include estimating an energy production for the wind farm for each of the control settings based at least in part on the contribution of the operating data points and controlling the wind farm based on optimal control settings.

19 Claims, 7 Drawing Sheets

(51) Int. Cl.
*H02J 3/38* (2006.01)
*F03D 9/25* (2016.01)
*H02P 101/15* (2016.01)

(52) U.S. Cl.
CPC ...... *F05B 2270/20* (2013.01); *H02P 2101/15* (2015.01); *Y02B 10/30* (2013.01); *Y02E 10/723* (2013.01); *Y02E 10/725* (2013.01)

(58) Field of Classification Search
CPC .. F05B 2270/1033; F03D 7/048; F03D 7/028; F03D 7/045; F03D 7/046; Y02E 10/725; Y02E 10/721; H02P 2101/15; Y10T 307/406; Y10T 307/469; Y02B 10/30
See application file for complete search history.

(56) References Cited

U.S. PATENT DOCUMENTS

| | | | |
|---|---|---|---|
| 6,840,734 B2 * | 1/2005 | Hansen | F03D 7/0224 415/1 |
| 6,975,925 B1 | 12/2005 | Barnes et al. | |
| 7,228,235 B2 | 6/2007 | Grzych et al. | |
| 8,185,331 B2 | 5/2012 | Parikh et al. | |
| 8,258,643 B2 * | 9/2012 | Bonnet | F03D 7/02 290/44 |
| 8,288,888 B2 * | 10/2012 | Hinatsu | C25B 15/02 307/24 |
| 8,509,956 B2 | 8/2013 | Jensen | |
| 8,847,419 B2 * | 9/2014 | Bertolotti | F03D 7/028 290/44 |
| 8,901,762 B2 * | 12/2014 | Hsiao | H02P 9/04 290/44 |
| 9,018,780 B2 * | 4/2015 | Martin Da Silva | F03D 7/028 290/44 |
| 9,217,412 B2 * | 12/2015 | Blake | F03D 1/0625 |
| 9,372,263 B2 * | 6/2016 | Oswald | G01S 13/42 |
| 2003/0160457 A1 | 8/2003 | Ragwitz et al. | |
| 2004/0119292 A1 * | 6/2004 | Datta | F03D 7/0272 290/44 |
| 2009/0299780 A1 | 12/2009 | Sarkar et al. | |
| 2010/0135790 A1 * | 6/2010 | Pal | F03D 1/0675 416/1 |
| 2010/0314881 A1 * | 12/2010 | Stone | F03D 15/00 290/55 |
| 2011/0142619 A1 | 6/2011 | Subramanian et al. | |
| 2011/0221193 A1 * | 9/2011 | Kalen | F03D 7/0212 290/44 |
| 2011/0309621 A1 | 12/2011 | Nielsen et al. | |
| 2012/0271593 A1 * | 10/2012 | Uluyol | F03D 7/048 702/179 |
| 2014/0203562 A1 * | 7/2014 | Black | F03D 7/043 290/44 |
| 2015/0167646 A1 * | 6/2015 | Hammerum | F03D 7/0224 416/1 |
| 2015/0219074 A1 * | 8/2015 | Babazadeh | F03D 7/048 290/44 |
| 2015/0292485 A1 * | 10/2015 | Wang | F03D 7/00 290/44 |
| 2015/0372510 A1 * | 12/2015 | Murata | H02J 7/007 320/101 |

OTHER PUBLICATIONS

Costa et al., "Optimization of energy generation in wind farm through fuzzy control", Artigo em Conferência Internacional, pp. 1-6, 2004.
Goit et al., "Optimal control of wind farm power extraction in large eddy simulations", AIAA SciTech 32nd ASME Wind Energy Symposium location:National Harbor, Maryland , pp. 1-11, Jan. 2014.
Gebraad et al., "Maximum power-point tracking control for wind farms", John Wiley & Sons, Ltd, Feb. 10, 2014.

* cited by examiner

SYSTEM AND METHOD FOR CONTROLLING A WIND FARM

FIELD OF THE INVENTION

The present invention relates generally to wind turbines, and more particularly, to systems and methods for controlling a wind farm.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and a rotor having one or more rotor blades. The rotor blades transform wind energy into a mechanical rotational torque that drives one or more generators via the rotor. The generators are sometimes, but not always, rotationally coupled to the rotor through the gearbox. The gearbox steps up the inherently low rotational speed of the rotor for the generator to efficiently convert the rotational mechanical energy to electrical energy, which is fed into a utility grid via at least one electrical connection. Such configurations may also include power converters that are used to convert a frequency of generated electric power to a frequency substantially similar to a utility grid frequency.

A plurality of wind turbines are commonly used in conjunction with one another to generate electricity and are commonly referred to as a "wind farm." Wind turbines on a wind farm typically include their own meteorological monitors that perform, for example, temperature, wind speed, wind direction, barometric pressure, and/or air density measurements. In addition, a separate meteorological mast or tower ("met mast") having higher quality meteorological instruments that can provide more accurate measurements at one point in the farm is commonly provided. The correlation of meteorological data with power output allows the empirical determination of a "power curve" for the individual wind turbines.

Traditionally, wind farms are controlled in a decentralized fashion to generate power such that each turbine is operated to maximize local energy output and to minimize impacts of local fatigue and extreme loads. However, in practice, such independent optimization of the wind turbines ignores farm-level performance goals, thereby leading to sub-optimal performance at the wind farm level. In addition, conventional wind turbine systems do not account for prevailing wind inflow and other ambient conditions. As the ambient conditions over the wind farm tend to change frequently, the initial models estimated for operating the wind farm may be inaccurate for use during real-time implementation. Inaccurate modeling of the wind parameters, in turn, may result in use of incorrect control settings for the wind turbines in the wind farm. Thus, the conventional optimization approaches for controlling a wind farm usually provide only a marginal improvement in the farm-level performance output.

Thus, a system and method for controlling a wind farm that provides a framework to better manage the trade-off between data availability and/or data quality from each of the wind turbines in the wind farm and energy estimates would be advantageous.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a method for controlling a wind farm having a plurality of wind turbines. The method includes a step of operating the wind farm based on multiple control settings over a plurality of time intervals. A next step includes collecting one or more wind parameters of the wind farm over the plurality of time intervals. Another step includes collecting one or more operating data points for each of the wind turbines in the wind farm for the plurality of time intervals. The method also includes a step of calculating a contribution of the operating data points for each of the wind turbines as a function of the one or more wind parameters. Further steps of the method include estimating an energy production for the wind farm for each of the control settings based at least in part on the contribution of the operating data points for each of the wind turbines and controlling the wind farm based on the control settings that provide an optimal energy production.

In another aspect, a system for controlling a wind farm including a plurality of wind turbines is disclosed. The system includes a processor communicatively coupled to the one or more sensors and a controller communicatively coupled to the processor. The processor is configured to: operate the wind farm based on multiple control settings over a plurality of time intervals, collect one or more wind parameters of the wind farm over the plurality of time intervals, collect one or more operating data points for each of the wind turbines in the wind farm for the plurality time intervals, calculate a contribution of the operating data points for each of the wind turbines as a function of the one or more wind parameters, and estimate an energy production for the wind farm for each of the control settings based at least in part on the contribution of the operating data points for each of the wind turbines. Further, the controller is configured to control the wind farm based on the control setting with an optimal energy production.

In yet another aspect, the present disclosure is directed to a method for controlling a wind farm including a plurality of wind turbines. The method includes (a) operating the wind farm based on first control settings over a first time interval; (b) collecting one or more wind parameters for the wind farm during the first time interval; (c) collecting one or more operating data points for the first time interval for each of the wind turbines in the wind farm; (d) calculating a contribution of the operating data points for each of the wind turbines for the first time interval as a function of the one or more wind parameters; (e) estimating an energy production for the wind farm for the first time interval; (f) repeating steps (a) through (e) for second control settings during a second time interval; (g) comparing the energy production from the first control settings with the energy production from the second control settings to determine optimal control settings; and, (h) controlling the wind farm based on the optimal control settings.

These and other features, aspects and advantages of the present invention will become better understood with reference the following description and appended claims. The accompanying drawings, which are incorporated in and constitute a part of this specification, illustrate the embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
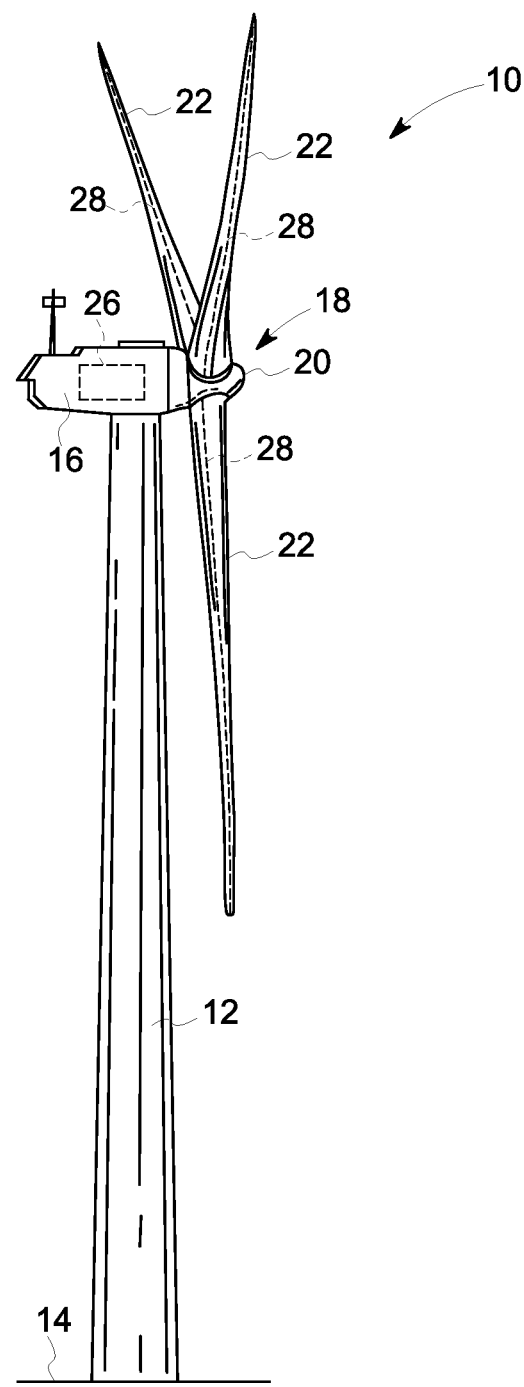
FIG. 1 illustrates a perspective view of one embodiment of a wind turbine.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to a system and method for controlling a wind farm including a plurality of wind turbines. For example, in one embodiment, the system operates the wind farm based on multiple control settings over a plurality of time intervals and determines which of the control settings is optimal. As used herein, the term "optimal control settings" or variations thereof are meant to encompass the one or more control settings that provide the highest energy production for the wind farm while also maintaining loads experienced by each of the wind turbines in the wind farm below a predetermined threshold. More specifically, the system collects one or more wind parameters (e.g. wind speed and/or wind direction) for the wind farm over the plurality of time intervals and one or more operating data points for the plurality time intervals for each of the wind turbines in the wind farm. In one embodiment, the system collects data utilizing a supervisory control and data acquisition (SCADA) server at the wind farm. The system then processes the data by calculating a contribution of the operating data points for each of the wind turbines as a function of the one or more wind parameters. In further embodiments, the system also estimates an energy production (e.g. an Annual Energy Production (AEP)) for the wind farm for each of the control settings based at least in part on the contribution of the operating data points for each of the wind turbines. In certain embodiments, the system may also estimate a statistical confidence of the estimated energy productions for the wind farm. Thus, the system is configured to control the wind farm based on the control settings that provide the optimal energy production, taking into account both data availability and data quality.

The various embodiments of the system and method described herein provide numerous advantages not present in the prior art. For example, the present disclosure provides a systematic solution for controlling a wind farm that addresses data quality analysis and detailed uncertainty bounds at the farm level. The uncertainty analysis provides a desired confidence about future performance of the wind farm. Further, the present disclosure is configured to use the maximum amount of collected data, while ensuring that the data quality of the estimated energy production is not affected. Thus, the present system corrects data quality issues arising at a farm level, thereby addressing various challenges associated with farm level modeling. In addition, the inventors of the present disclosure discovered that farm level power curves and energy production estimates may not be well-suited for different type of wind farms. Thus, the current invention is not dependent on farm specific details and can dynamically select the most suited method or algorithm for calculating the energy production based on performance of desired metrics. Accordingly, the present disclosure may be easily installed from one farm to another.

Referring now to the drawings, FIG. 1 illustrates a perspective view of one embodiment of a wind turbine 10 configured to implement the control technology according to the present disclosure. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator (not shown) positioned within the nacelle 16 to permit electrical energy to be produced.

The wind turbine 10 may also include a wind turbine controller 26 centralized within the nacelle 16. However, in other embodiments, the controller 26 may be located within any other component of the wind turbine 10 or at a location outside the wind turbine. Further, the controller 26 may be communicatively coupled to any number of the components of the wind turbine 10 in order to control the operation of such components and/or to implement a control action. As such, the controller 26 may include a computer or other suitable processing unit. Thus, in several embodiments, the controller 26 may include suitable computer-readable instructions that, when implemented, configure the controller 26 to perform various different functions, such as receiving, transmitting and/or executing wind turbine control signals. Accordingly, the controller 26 may generally be configured to control the various operating modes of the wind turbine 10 (e.g., start-up or shut-down sequences), de-rate or up-rate the wind turbine 10, and/or control various components of the wind turbine 10. For example, the controller 26 may be configured to control the blade pitch or pitch angle of each of the rotor blades 22 (i.e., an angle that determines a perspective of the rotor blades 22 with respect to the direction of the wind) to control the power output generated by the wind turbine 10 by adjusting an angular position of at least one rotor blade 22 relative to the wind. For instance, the controller 26 may control the pitch angle of the rotor blades 22 by rotating the rotor blades 22 about a pitch axis 28, either individually or simultaneously, by transmitting suitable control signals to a pitch drive or pitch adjustment mechanism (not shown) of the wind turbine 10.

Figure 2:
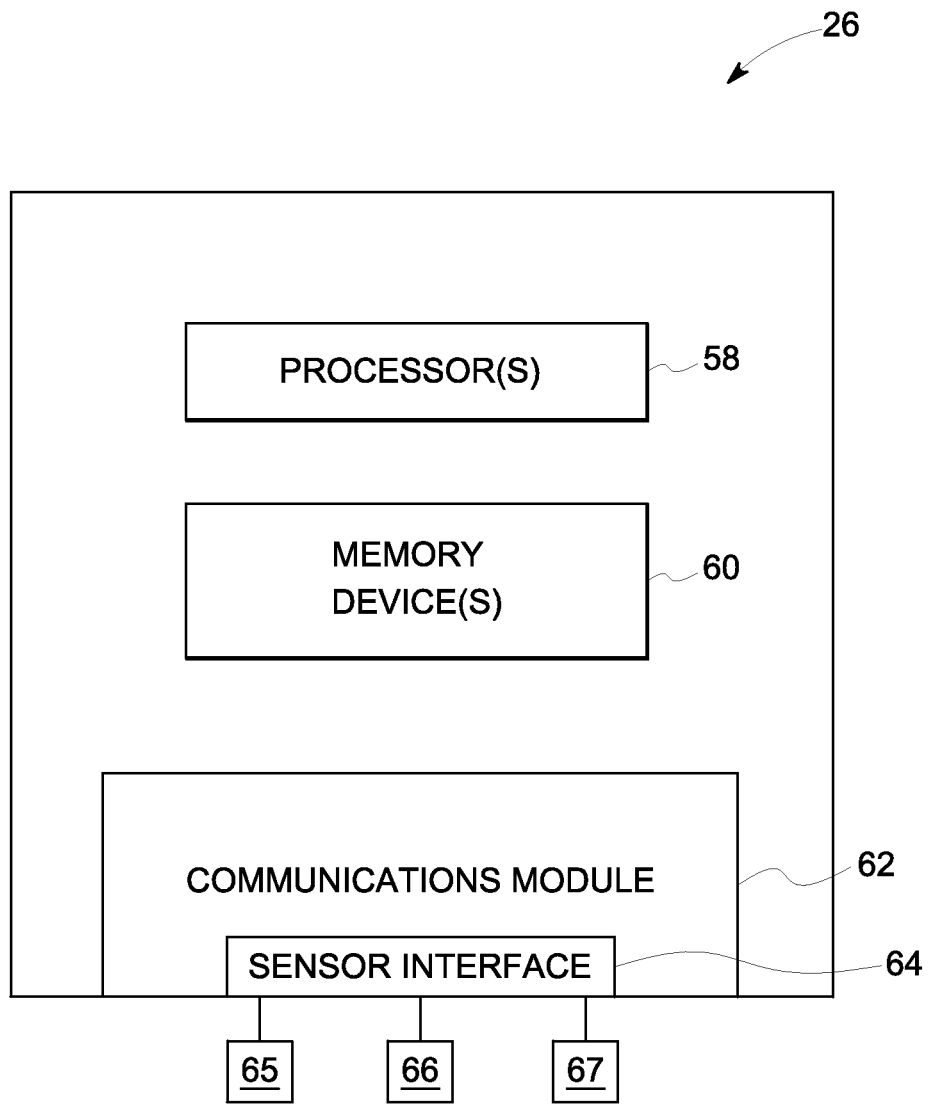
FIG. 2 illustrates a schematic view of one embodiment of a controller for use with the wind turbine shown in FIG. 1.

Referring now to FIG. 2, a block diagram of one embodiment of suitable components that may be included within the controller 26 is illustrated in accordance with aspects of the present disclosure. As shown, the controller 26 may include one or more processor(s) 58 and associated memory device(s) 60 configured to perform a variety of computer-implemented functions (e.g., performing the methods, steps, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, application-specific processors, digital signal processors (DSPs), Application Specific Integrated Circuits (ASICs), Field Programmable Gate Arrays (FPGAs), and/or any other programmable circuits. Further, the memory device(s) 60 may generally include memory element(s) including, but are not limited to, computer readable medium (e.g., random access memory (RAM)), computer readable non-volatile medium (e.g., a flash memory), one or more hard disk drives, a floppy disk, a compact disc-read only memory (CD-ROM), compact disk-read/write (CD-R/W) drives, a magneto-optical disk (MOD), a digital versatile disc (DVD), flash drives, optical drives, solid-state storage devices, and/or other suitable memory elements.

Additionally, the controller 26 may also include a communications module 62 to facilitate communications between the controller 26 and the various components of the wind turbine 10. For instance, the communications module 62 may include a sensor interface 64 (e.g., one or more analog-to-digital converters) to permit the signals transmitted by one or more sensors 65, 66, 67 to be converted into signals that can be understood and processed by the controller 26. Furthermore, it should be appreciated that the sensors 65, 66, 67 may be communicatively coupled to the communications module 62 using any suitable means. For example, as shown in FIG. 2, the sensors 65, 66, 67 are coupled to the sensor interface 64 via a wired connection. However, in alternative embodiments, the sensors 65, 66, 67 may be coupled to the sensor interface 64 via a wireless connection, such as by using any suitable wireless communications protocol known in the art. For example, the communications module 62 may include the Internet, a local area network (LAN), wireless local area networks (WLAN), wide area networks (WAN) such as Worldwide Interoperability for Microwave Access (WiMax) networks, satellite networks, cellular networks, sensor networks, ad hoc networks, and/or short-range networks. As such, the processor 58 may be configured to receive one or more signals from the sensors 65, 66, 67.

The sensors 65, 66, 67 may be any suitable sensors configured to measure any operating data points of the wind turbine 10 and/or wind parameters of the wind farm. For example, the sensors 65, 66, 67 may include blade sensors for measuring a pitch angle of one of the rotor blades 22 or for measuring a loading acting on one of the rotor blades 22; generator sensors for monitoring the generator (e.g. torque, rotational speed, acceleration and/or the power output); and/or various wind sensors for measuring various wind parameters (e.g. wind speed, wind direction, etc.). Further, the sensors 65, 66, 67 may be located near the ground of the wind turbine 10, on the nacelle 16, on a meteorological mast of the wind turbine 10, or any other location in the wind farm.

It should also be understood that any other number or type of sensors may be employed and at any location. For example, the sensors may be accelerometers, pressure sensors, strain gauges, angle of attack sensors, vibration sensors, MIMU sensors, camera systems, fiber optic systems, anemometers, wind vanes, Sonic Detection and Ranging (SODAR) sensors, infra lasers, Light Detecting and Ranging (LIDAR) sensors, radiometers, pitot tubes, rawinsondes, other optical sensors, and/or any other suitable sensors. It should be appreciated that, as used herein, the term "monitor" and variations thereof indicates that the various sensors of the wind turbine 10 may be configured to provide a direct measurement of the parameters being monitored or an indirect measurement of such parameters. Thus, the sensors 65, 66, 67 may, for example, be used to generate signals relating to the parameter being monitored, which can then be utilized by the controller 26 to determine the actual condition.

Figure 3:
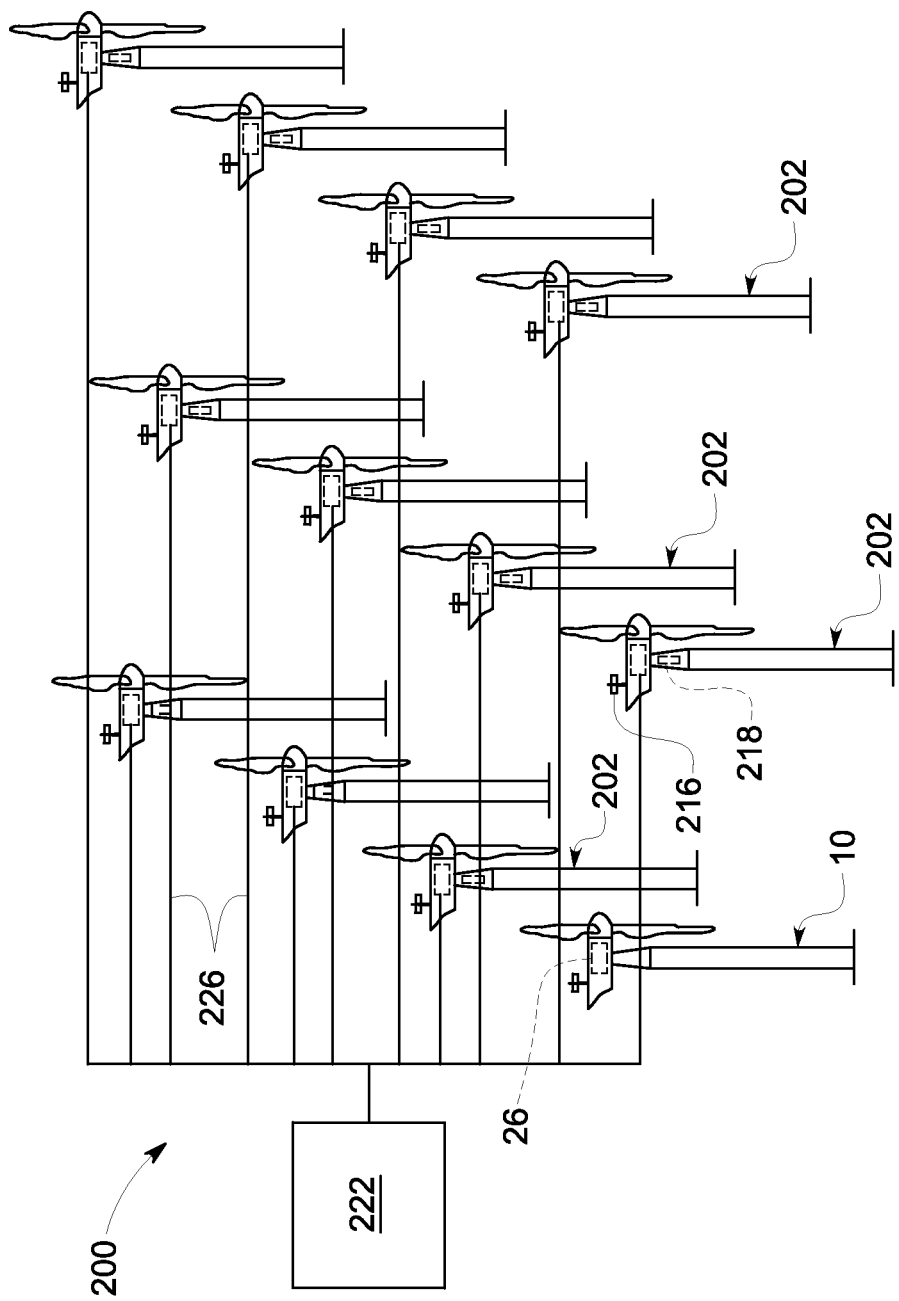
FIG. 3 illustrates a schematic view of one embodiment of a wind farm according to the present disclosure.

Referring now to FIG. 3, a wind farm 200 that is controlled according to the system and method of the present disclosure is illustrated. As shown, the wind farm 200 may include a plurality of wind turbines 202, including the wind turbine 10 described above, and a farm controller 222. For example, as shown in the illustrated embodiment, the wind farm 200 includes twelve wind turbines, including wind turbine 10. However, in other embodiments, the wind farm 200 may include any other number of wind turbines, such as less than twelve wind turbines or greater than twelve wind turbines. In one embodiment, the controller 26 of the wind turbine 10 may be communicatively coupled to the farm controller 222 through a wired connection, such as by connecting the controller 26 through suitable communicative links 226 (e.g., a suitable cable). Alternatively, the controller 26 may be communicatively coupled to the farm controller 222 through a wireless connection, such as by using any suitable wireless communications protocol known in the art. In addition, the farm controller 222 may be generally configured similar to the controllers 26 for each of the individual wind turbines 202 within the wind farm 200.

In several embodiments, one or more of the wind turbines 202 in the wind farm 200 may include a plurality of sensors for monitoring various operating data points or control settings of the individual wind turbines 202 and/or one or more wind parameters of the wind farm 200. For example, as shown, each of the wind turbines 202 includes a wind sensor 216, such as an anemometer or any other suitable device, configured for measuring wind speeds or any other wind parameter. For example, in one embodiment, the wind parameters include information regarding at least one of or a combination of the following: a wind gust, a wind speed, a wind direction, a wind acceleration, a wind turbulence, a wind shear, a wind veer, a wake, SCADA information, or similar.

As is generally understood, wind speeds may vary significantly across a wind farm 200. Thus, the wind sensor(s) 216 may allow for the local wind speed at each wind turbine 202 to be monitored. In addition, the wind turbine 202 may also include one or more additional sensors 218. For instance, the sensors 218 may be configured to monitor electrical properties of the output of the generator of each wind turbine 202, such as current sensors, voltage sensors, temperature sensors, or power sensors that monitor power output directly based on current and voltage measurements. Alternatively, the sensors 218 may include any other sensors that may be utilized to monitor the power output of a wind turbine 202. It should also be understood that the wind turbines 202 in the wind farm 200 may include any other suitable sensor known in the art for measuring and/or monitoring wind parameters and/or wind turbine operating data points.

Figure 4:
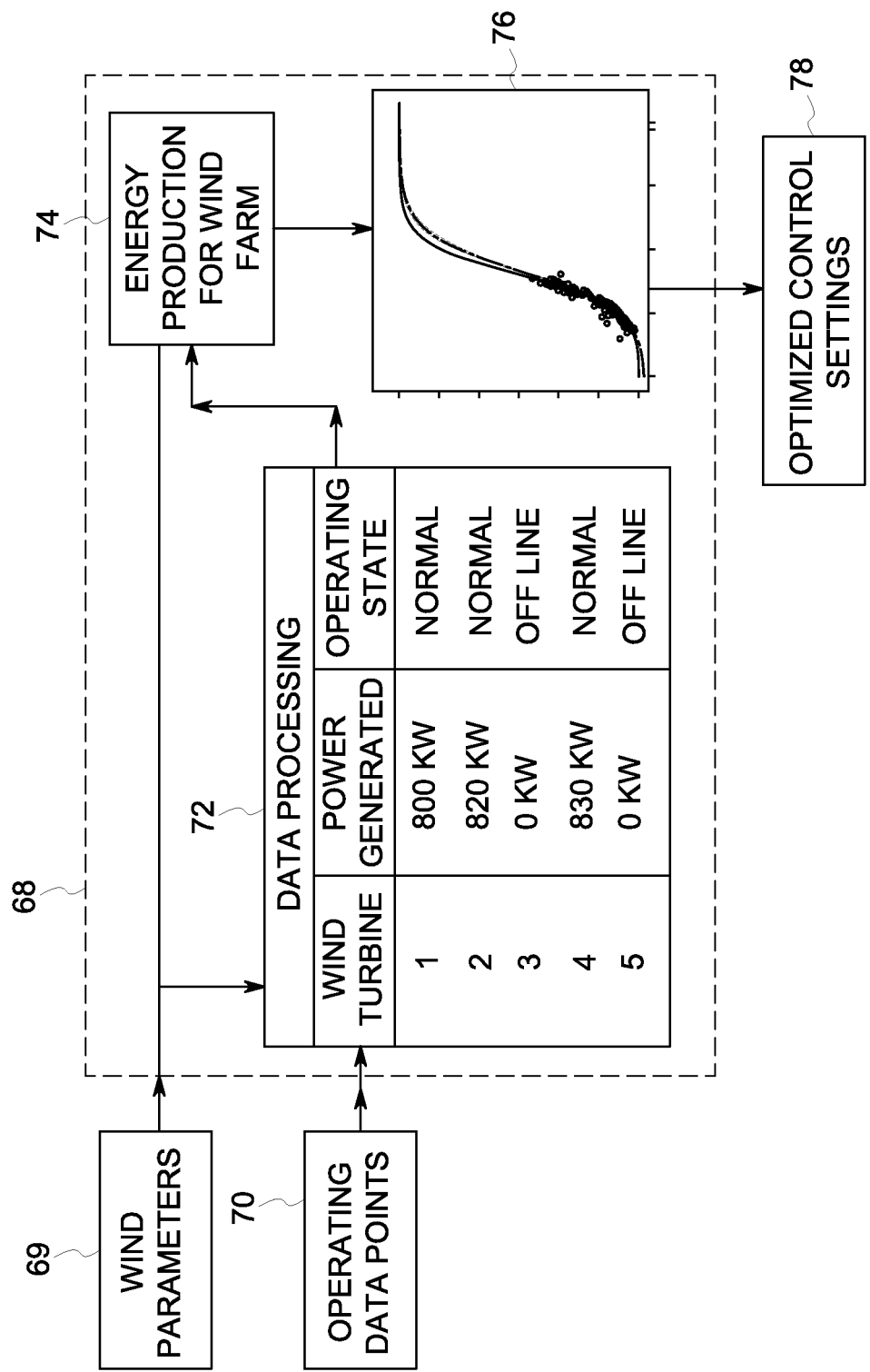
FIG. 4 illustrates a schematic view of one embodiment of a processor according to the present disclosure.

Referring now to FIG. 4, a schematic view of one embodiment of a processor 68 of the farm controller 222 is illustrated in accordance with aspects of the present disclosure. The wind farm processor(s) 68 is configured to perform any of the steps of the present disclosure as described herein. As independent optimization of the wind turbines 202 may further actually decrease overall energy production of the wind farm 200, it is desirable to configure operation of the wind turbines 202 such that the farm-level energy output, AEP, fatigue loads, and/or noise in the wind farm 200 remain within corresponding designated thresholds. Particularly, it is desirable to continually adjust the control settings of each of the interacting wind turbines 202 based on data availability (e.g. by parameter, by time) and analysis quality in real-time such that farm-level performance goals are consistently achieved. More specifically, as shown, the processor 68 is configured to operate the wind farm 200 based on multiple control settings over a plurality of time intervals. Thus, the processor 68 is configured to collect one or more wind parameters 69 for the wind farm 200 over a plurality of time intervals and one or more operating data points 70 for the plurality time intervals for each of the wind turbines 202 in the wind farm 200. In one embodiment, the wind parameters 69 and/or the operating data points 70 may be generated via one or more of the sensors (e.g. via sensors 65, 66, 67, 216, 218, or any other suitable sensor). Alternatively, the wind parameters 69 and/or the operating data points 70 may be estimated via a computer model within the processor 68.

In addition, the processor 68 is configured to process the wind parameters 69 and the operating data points 70 in a variety of ways. For example, in one embodiment, the processor 68 may include one or more data quality algorithms configured to process the operating data. In additional embodiments, the processor 68 may be configured to filter, average, and/or adjust the one or more operating data points 70. More specifically, the data quality algorithms may be configured so as to filter one or more outliers, account for missing data points, and/or any other suitable processing step. Thus, the data quality algorithms provide a framework to better manage the trade-off between data availability (e.g. by parameter, by time) and analysis quality as will be discussed in more detail below.

For example, in various embodiments, the algorithms process the wind parameters 69 and the operating data points 70 to determine an operational state of each of the wind turbines 202 during each of the plurality of time intervals. For example, as shown in the data processing table 72 of FIG. 4, sample operating data points for five different wind turbines 202 in the wind farm 200 are illustrated. As shown, the operating data points 70 may also include information regarding the wind turbine identifier, the power generated (in kilowatts, kW), and the operating state. In further embodiments, the operating data points 70 may include information regarding at least one of or a combination of the following: a pitch angle, a generator speed, a power output, a torque output, a tip speed ratio, yaw alignment or misalignment, an operational state of the wind turbine, one or more control settings, a temperature, a pressure, or similar, as well as information regarding any non-operating wind turbines on the wind farm.

Based on the operating data points 70, the wind farm processor 68 is configured to infer the operating state of each wind turbine 202, which indicates whether the wind turbine 202 is operating in a normal or a non-normal state. More specifically, a "normal state" indicates that the wind turbine 202 is generating power according to its control settings and/or power curve. A "non-normal state" indicates that the wind turbine 202 is not generating power according to its control settings and/or power curve. Thus, the processor 68 can infer whether the wind turbine 202 is operating normally, whether it is off-line for routine maintenance, non-routine maintenance, or any other reason (e.g. power outage, etc.), or whether the wind turbine 202 is operating somewhere in between the normal and off-line state.

For example, as shown in FIG. 4, wind turbines 1, 2, and 5 are generating power as expected (i.e. 800 kW, 820 kW, and 830 kW, respectively), whereas wind turbines 2 and 4 are not generating any power (as indicated by 0 kW). As such, the processor 68 determines the operating state of the wind turbines 202 based on the power generated (or any other suitable operating data point described herein). Accordingly, as shown, the processor 68 has determined that wind turbine 1, 2, and 5 are operating in a normal or standard state, whereas wind turbines 2 and 4 are off-line.

In additional embodiments, the data quality algorithms are configured to calculate a contribution of each of the wind turbines 202 to the operating data points as a function of the one or more wind parameters 69, e.g. a wind speed. As used herein, the term "contribution" or variations thereof is meant to encompass the amount of operating data points 70 that is collected from each individual wind turbine 202 in the wind farm 200 as compared to other wind turbines 202 in the wind farm 200. In other words, if a first wind turbine is operating in a normal state and a second wind turbine is operating at a non-normal state, the contribution of data collected by the first wind turbine will be greater than that of the second wind turbine. Further, the processor 68 can calculate a percentage of each contribution of each of the wind turbines 202 to a total contribution for all of the wind turbines 202 of the wind farm 200 and apply a correction factor to each of the percentages. As such, the processor 68 uses all of the collected data, but corrects for data collected from wind turbines 202 that are not operating properly. Thus, the processor 68 utilizes the maximum amount of collected data, rather than eliminating or removing data collected from wind turbines 202 operating in a non-standard manner.

Still referring to the embodiment of FIG. 4, the processor 68 is then configured to estimate an energy production 74 for the wind farm 200 for each of the control settings based at least in part on the contribution of the operating data points 70 for each of the wind turbines 202. For example, as shown, the energy production 74 for the wind farm 200 is based on the processed data generated by wind turbines 1 through 5 combined with the one or more wind parameters 69. In additional embodiments, the processor 68 can also determine a plurality of energy productions 74 for each control setting using multiple data quality algorithms and dynamically determine an optimal energy production from the plurality of energy productions based on various conditions, including but not limited to wind farm 200 site conditions, wind turbine 202 operating parameters or data points, wind turbine 202 model specifications, or similar. More specifically, in various embodiments, the site conditions may also include a known geometric layout of the wind farm 200, including the number of neighboring wind turbines 202, actual wind turbine locations 202, relative locations of the downstream and upstream wind turbines 202, and/or information about the terrain of the wind farm 200. Thus, the processor 68 is configured to dynamically select the most suited algorithm for calculating the energy production 74 based on performance of desired metrics.

Figure 5:
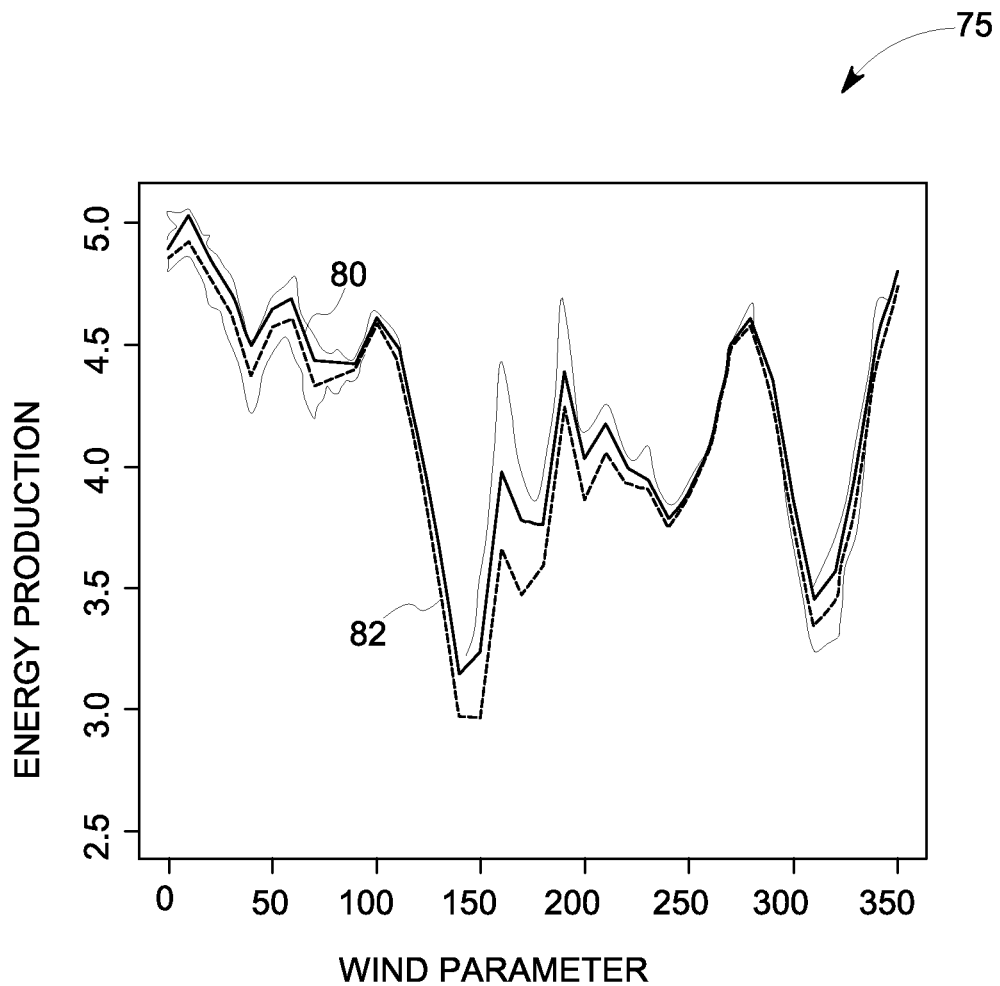
FIG. 5 illustrates a graph of one embodiment of energy production (y-axis) for multiple control settings as a function of one or more wind parameters (x-axis) according to the present disclosure.

Referring now to FIG. 5, the wind farm processor 68 may evaluate more than one control setting and compare the control settings to determine an optimal control setting. For example, as shown, one embodiment of a graph 75 generated by the processor 68 during data analysis and filtering at a particular wind speed is illustrated. As shown, the graph 75 illustrates energy production (y-axis) for multiple control settings as a function of one or more wind parameters (x-axis), e.g. wind direction in degrees, according to the present disclosure. More specifically, the graph 75 includes data generated from operation at a first control setting 80 superimposed with data generated from operation at a second control setting 82. As shown, the first control setting 80 corresponds to an overall higher energy production; therefore, in the illustrated embodiment, the optimal control setting corresponds to the first control setting 80.

Figure 6:
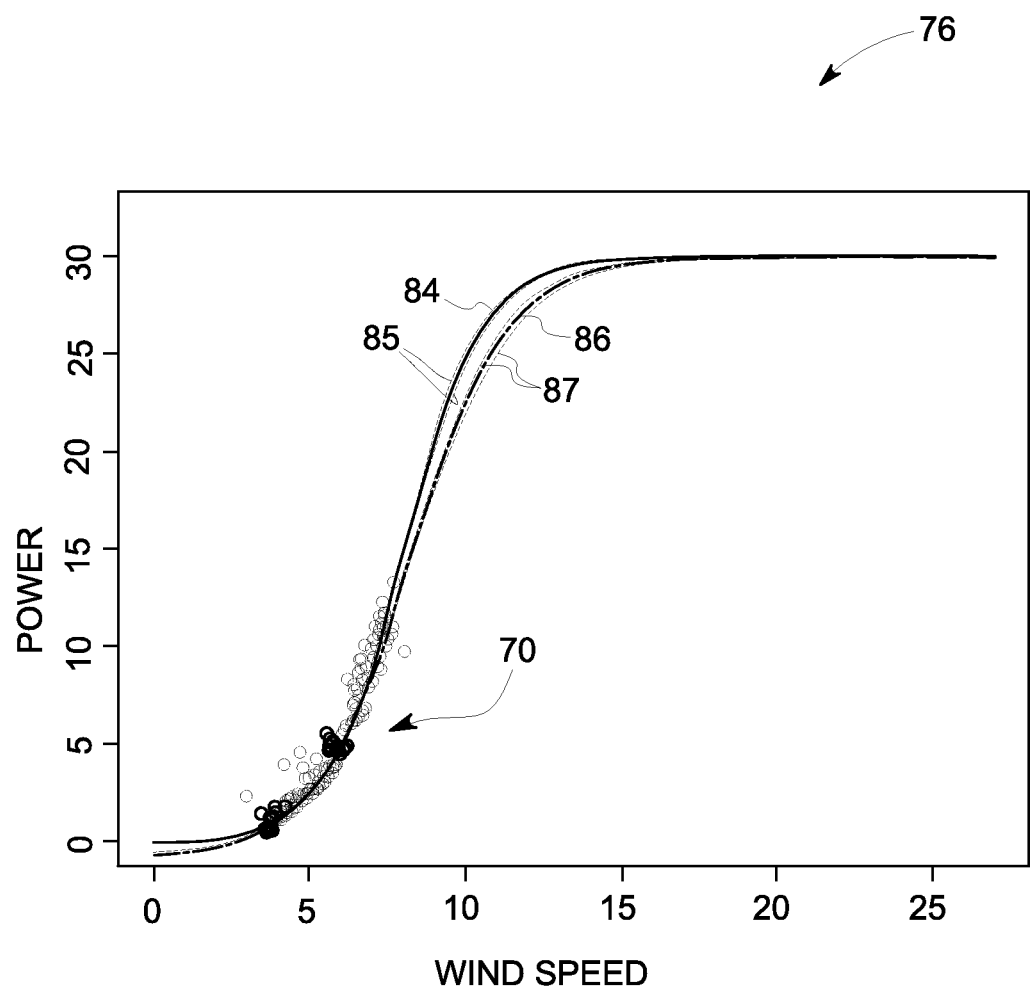
FIG. 6 illustrates a graph of one embodiment of a power curve model with power along the y-axis and wind speed along the x-axis according to the present disclosure; and, FIG. 7 illustrates a flow diagram of one embodiment of a method according to the present disclosure.

Referring to FIGS. 4 and 6, in certain embodiments, the wind farm processor 68 can also generate a real-time power curve model 76 for the wind farm 200 based on the estimated energy production 74 for the wind farm 200 and dynamically control the wind farm 200 based on the power curve model 76. For example, as shown in FIG. 6, the processor 68 evaluates a power curve 84 for the first control setting and a power curve 86 for a second control setting and determines which control setting is optimal. In addition, the processor 68 may determine at least one estimate of a statistical confidence of the estimated energy productions 74 and/or the power curves 84, 86. The statistical confidence of the energy production 74 can be determined in a variety of ways. For example, as shown in FIG. 6, a +/− standard deviation (e.g. +/−10%), as represented by dotted lines 85 and 87, is determined for each of the power curves 84, 86. In further embodiments, the statistical confidence of the energy production can be determined using one of or a combination of the following: distribution metrics for the operational parameters, analysis of the behavior of the operating data points across various control settings, a breakdown point, an influence function, a trimmed mean, a sensitivity curve, or any other suitable method and/or calculation known in the art for determining a confidence bounds. For example, in one embodiment, the statistical confidence of the energy production may be estimated by determining a distribution of at least a portion of the operating data points. In a further embodiment, the behavior of the operating data points across various control settings can be analyzed to determine the data spread over time. Further, the behavior of the data points can be analyzed by determining a trending and/or standard deviation or mean of the operating data points. By understanding the trend of the operating data points, the processor 68 can estimate or predict how the data points will behave in a subsequent period of time. Further, the optimal control setting may be determined based on the trade-off between data availability and/or data quality analysis.

In addition, and referring to FIG. 4, the processor 68 may implement one or more control actions to one or more of the wind turbines 202 within the wind farm 200 so as to control the wind farm 200 and optimize the AEP of the wind farm 200. In certain embodiments, for example, the processor 68 may determine updated or optimized control settings 78 based on the power curve model 76. More specifically, the optimized control settings may include at least one of the following: altering the pitch angle of a rotor blade, modifying a generator torque, modifying the generator speed, modifying the power output, yawing a nacelle of the wind turbine, braking one or more wind turbine components, adding or activating an airflow modifying element on a surface of the rotor blade, or similar.

Figure 7:
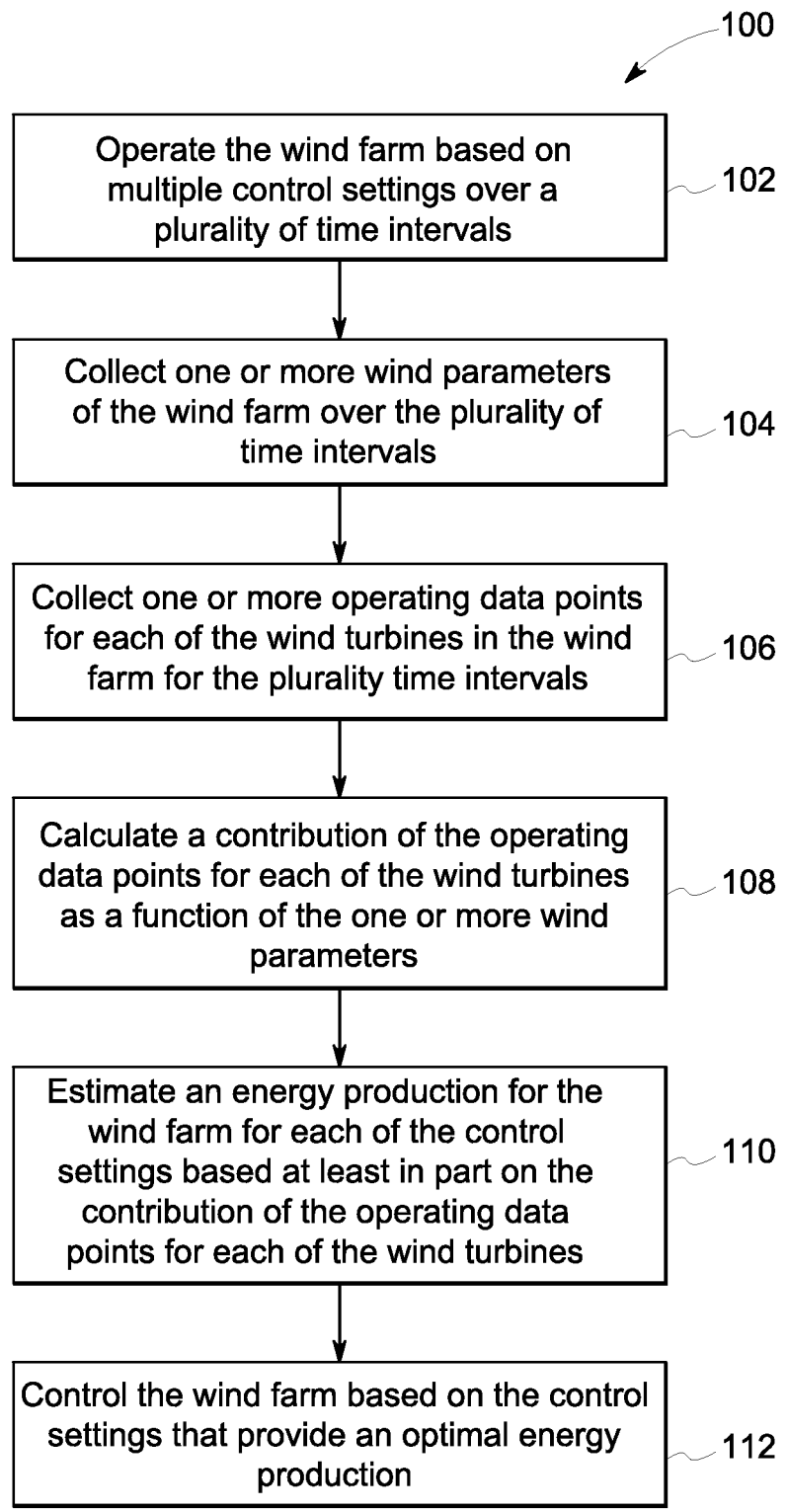

Referring to FIG. 7, one embodiment of a method 100 for controlling a wind farm 200 is illustrated. As shown, the method 100 includes a step 102 of operating the wind farm based on multiple control settings over a plurality of time intervals. Another step 104 includes collecting one or more wind parameters for the wind farm 200 over a plurality of time intervals. A further step 106 includes collecting one or more operating data points for each of the wind turbines 202 in the wind farm 200 for the plurality time intervals. The method 100 also includes calculating 108 a contribution of the operating data points for each of the wind turbines as a function of the one or more wind parameters. A next step 110 includes estimating an energy production for the wind farm 200 for each of the control settings based at least in part on the contribution of the operating data points for each of the wind turbines 202. Another step 112 includes controlling the wind farm 200 based on the control settings that provide an optimal energy production.

Exemplary embodiments of a wind farm, a controller for a wind farm, and a method for controlling a wind farm are described above in detail. The method, wind farm, and controller are not limited to the specific embodiments described herein, but rather, components of the wind turbines and/or the controller and/or steps of the method may be utilized independently and separately from other components and/or steps described herein. For example, the controller and method may also be used in combination with other power systems and methods, and are not limited to practice with only the wind turbine controller as described herein. Rather, the exemplary embodiment can be implemented and utilized in connection with many other wind turbine or power system applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. A method for controlling a wind farm including a plurality of wind turbines, the method comprising:
   operating the wind farm based on multiple control settings over a plurality of time intervals;
   collecting one or more wind parameters of the wind farm over the plurality of time intervals;
   collecting one or more operating data points for each of the wind turbines in the wind farm for the plurality of time intervals;
   calculating a contribution of the operating data points for each of the wind turbines as a function of the one or more wind parameters;

estimating an energy production for the wind farm for each of the control settings based at least in part on the contribution of the operating data points for each of the wind turbines;

controlling the wind farm based on the control settings that provide an optimal energy production; and wherein calculating the contribution of the operating data points for each of the wind turbines as a function of the one or more wind parameters further comprises:

determining a percentage of each the contributions of each of the wind turbines to a total contribution for all of the wind turbines of the wind farm; and applying a correction factor to each of the percentages.

2. A method for controlling a wind farm including a plurality of wind turbines, the method comprising:
   a) operating the wind farm based on first control settings over a first time interval;
   b) collecting one or more wind parameters for the wind farm during the first time interval;
   c) collecting one or more operating data points for the first time interval for each of the wind turbines in the wind farm;
   d) calculating a contribution of the operating data points for each of the wind turbines for the first time interval as a function of the one or more wind parameters;
   e) estimating an energy production for the wind farm for the first time interval;
   f) repeating steps (a) through (e) for second control settings during a second time interval:
   g) comparing the energy production from the first control settings with the energy production from the second control settings to determine optimal control settings;
   h) controlling the wind farm based on the optimal control settings; and
   wherein calculating a contribution of the operating data points for each of the wind turbines for the first and second time intervals as a function of the one or more wind parameters further comprises:
   determining a percentage of each the contributions of each of the wind turbines to a total contribution for all of the wind turbines of the wind farm; and,
   applying a correction factor to each of the percentages.

3. A method for controlling a wind farm including a plurality of wind turbines, the method comprising:
   operating the wind farm based on multiple control settings over a plurality of time intervals;
   collecting one or more wind parameters of the wind farm over the plurality of time intervals;
   collecting one or more operating data points for each of the wind turbines in the wind farm for the plurality of time intervals, and determining an operational state of each of the wind turbines during each of the plurality of time intervals based on the collected data points;
   calculating a contribution of the operating data points for each of the wind turbines as a function of the one or more wind parameters by applying a correction to account for the data points collected from the wind turbines determined to be operating in a non-standard manner;
   estimating an energy production for the wind farm for each of the control settings based at least in part on the contribution of the operating data points for each of the wind turbines; and,
   controlling the wind farm based on the control settings that provide an optimal energy production.

4. The method of claim 1, further comprising at least one of filtering the one or more operating data points, averaging the one or more operating data points, or adjusting the one or more operating data points to account for missing data points.

5. The method of claim 1, wherein controlling the wind farm further comprises estimating a real-time power curve model for the wind farm based on the optimal energy production and controlling the wind farm based on the power curve model.

6. The method of claim 1, further comprising determining at least one estimate of a statistical confidence of the energy production for the wind farm for each of the control settings.

7. The method of claim 1, wherein estimating the energy production for the wind farm for each of the control settings is further based at least in part on one or more of the following: wind farm site conditions, wind turbine operating parameters, wind turbine location in the wind farm, or wind turbine model specifications.

8. The method of claim 1, wherein the wind parameters comprise information regarding at least one of or a combination of the following: a wind gust, a wind speed, a wind direction, a wind acceleration, a wind turbulence, a wind shear, a wind veer, a wake, or SCADA information.

9. The method of claim 1, wherein the operating data points comprise information regarding at least one of or a combination of the following: a pitch angle, a generator speed, a power output, a torque output, a tip speed ratio, an operational state of the wind turbine, one or more control settings, a temperature, and a pressure.

10. The method of claim 1, wherein controlling the wind farm based on the control settings that provide the optimal energy production further comprises:
    implementing one or more control actions to one or more of the wind turbines within the wind farm so as to optimize the energy production of the wind farm,
    wherein the one or more control actions comprise at least one of altering the pitch angle of a rotor blade, modifying a generator torque, modifying the generator speed, modifying the power output, yawing a nacelle of the wind turbine, braking one or more wind turbine components, or adding or activating an airflow modifying element on a surface of the rotor blade.

11. A system for controlling a wind farm including a plurality of wind turbines, the system comprising:
    a processor communicatively coupled to the one or more sensors, the processor configured to:
    operate the wind farm based on multiple control settings over a plurality of time intervals,
    collect one or more wind parameters of the wind farm over the plurality of time intervals,
    collect one or more operating data points for each of the wind turbines in the wind farm for the plurality time intervals, and determine an operational state of each of the wind turbines during each of the plurality of time intervals based on the collected data points,
    calculate a contribution of the operating data points for each of the wind turbines as a function of the one or more wind parameters by applying a correction to account for the data points collected from the wind turbines determined to be operating in a non-standard manner, and
    estimate an energy production for the wind farm for each of the control settings based at least in part on the contribution of the operating data points for each of the wind turbines; and,
    a controller communicatively coupled to the processor, wherein the controller is configured to control the wind farm based on the control settings that provide an optimal energy production.

12. A method for controlling a wind farm including a plurality of wind turbines, the method comprising:
   a) operating the wind farm based on first control settings over a first time interval;
   b) collecting one or more wind parameters for the wind farm during the first time interval;
   c) collecting one or more operating data points for the first time interval for each of the wind turbines in the wind farm, and determining an operational state of each of the wind turbines during the first time interval based on the collected data points;
   d) calculating a contribution of the operating data points for each of the wind turbines for the first time interval as a function of the one or more wind parameters by applying a correction to account for the data points collected from the wind turbines determined to be operating in a non-standard manner;
   e) estimating an energy production for the wind farm for the first time interval;
   f) repeating steps (a) through (e) for second control settings during a second time interval;
   g) comparing the energy production from the first control settings with the energy production from the second control settings to determine optimal control settings; and,
   h) controlling the wind farm based on the optimal control settings.

13. The method of claim 12, further comprising processing the operating data points for each of the wind turbines to determine an operational state of each of the wind turbines during the first and second time intervals, wherein processing the operating data points further comprises at least one of filtering the one or more operating data points, averaging the one or more operating data points, or adjusting the one or more operating data points to account for missing data points.

14. The method of claim 12, wherein controlling the wind farm further comprises estimating a real-time power curve model for the wind farm based on the optimal control settings and controlling the wind farm based on the power curve model.

15. The method of claim 12, further comprising determining at least one estimate of a statistical confidence of the energy production for the wind farm for the first and second control settings.

16. The method of claim 12, wherein estimating the energy production for the wind farm for each of the control settings is further based at least in part on one or more of the following: wind farm site conditions, wind turbine operating parameters, wind turbine location in the wind farm, or wind turbine model specifications.

17. The method of claim 12, wherein the wind parameters comprise information regarding at least one of or a combination of the following: a wind gust, a wind speed, a wind direction, a wind acceleration, a wind turbulence, a wind shear, a wind veer, a wake, or SCADA information.

18. The method of claim 12, wherein the operating data points comprise information regarding at least one of or a combination of the following: a pitch angle, a generator speed, a power output, a torque output, a tip speed ration, an operational state of the wind turbine, one or more control settings, a temperature, and a pressure.

19. The method of claim 12, wherein controlling the wind farm based on the optimal control settings further comprises:
   implementing one or more control actions to one or more of the wind turbines within the wind farm so as to optimize the energy production of the wind farm,
   wherein the one or more control actions comprise at least one of altering the pitch angle of a rotor blade, modifying a generator torque, modifying the generator speed, modifying the power output, yawing a nacelle of the wind turbine, braking one or more wind turbine components, or adding or activating an airflow modifying element on a surface of the rotor blade.

* * * * *